United States Patent [19]

Nicholson

[11] Patent Number: 4,890,816
[45] Date of Patent: Jan. 2, 1990

[54] VALVE SEATS

[75] Inventor: Terence P. Nicholson, Derwentside, Great Britain

[73] Assignee: Specialist Sealing Limited, Channel Islands, Channel Islands

[21] Appl. No.: 206,744

[22] Filed: Jun. 15, 1988

[30] Foreign Application Priority Data

Jul. 13, 1987 [GB] United Kingdom ............... 8716445

[51] Int. Cl.$^4$ ............................................. F16K 25/00
[52] U.S. Cl. .................................... 251/174; 251/306; 251/315
[58] Field of Search .............. 251/306, 307, 314, 170, 251/173, 174, 315

[56] References Cited

U.S. PATENT DOCUMENTS

| | | | |
|---|---|---|---|
| 3,394,915 | 7/1968 | Gachot | 251/174 |
| 3,834,663 | 9/1974 | Donnelly | 251/173 |
| 4,241,895 | 12/1980 | Sternenberg et al. | 251/173 |
| 4,293,116 | 10/1981 | Hinrichs | 251/173 |
| 4,601,475 | 7/1986 | Nicholson | 277/205 |

FOREIGN PATENT DOCUMENTS 2817355 of 1978 Fed. Rep. of Germany.

Primary Examiner—John Fox
Attorney, Agent, or Firm—Waldron & Associates

[57] ABSTRACT

A metal valve seat for a butterfly valve or ball valve and has the form of an apertured disc with a radially outward part (4A) by which it is securable to a valve body and a radially inward dished part (4B) which projects laterally around the disc aperture. The valve seat is characterized in that the disc part (4B) is formed circumferentially with a plurality of web-connected fingers which have a radially inward surface of varying generative radius. The invention also consists in a butterfly valve or a ball valve incorporating one or a pair of such metal valve seats.

13 Claims, 16 Drawing Sheets

VALVE SEATS

This invention relates to valve seats and more particularly to annular valve seats for installation in butterfly valves and ball valves, and also to such butterfly and ball valves when thus equipped.

The invention has been devised with the object of providing an annular metallic valve seat for installation in ball and butterfly valves and which is both durable and possessed of sufficient flexibility to ensure a reliable leak-proof seal between the body of a valve and a movable ball or butterfly element when the latter is in its closed position under all operating conditions of temperature and pressure with stability for use with all kinds of liquids.

Thus, in accordance with the present invention there is proposed a metal valve seat for a butterfly or ball valve having the form of an apertured disc with a radially outward part by which it is securable to a valve body and a radially inward dished part which projects laterally around the aperture. This radially inward dished part is formed circumferentially with a plurality of webbed fingers having a radially inward surface of varying generative radius intended to be an interference fit with a butterfly valve disc or ball valve ball.

The invention also consists in a ball valve or a butterfly valve, each of whatever type, when equipped with a seat, or a pair of seats, as above defined.

Various forms of the valve seat and various modes of incorporation in typical butterfly valves and ball valves are illustrated in the accompanying drawings to which reference will hereafter be made.

FIGS. 29 to 32 inclusive illustrate various possible combinations of non-metallic valve seals with valve seats in accordance with the invention.

Figure 1:
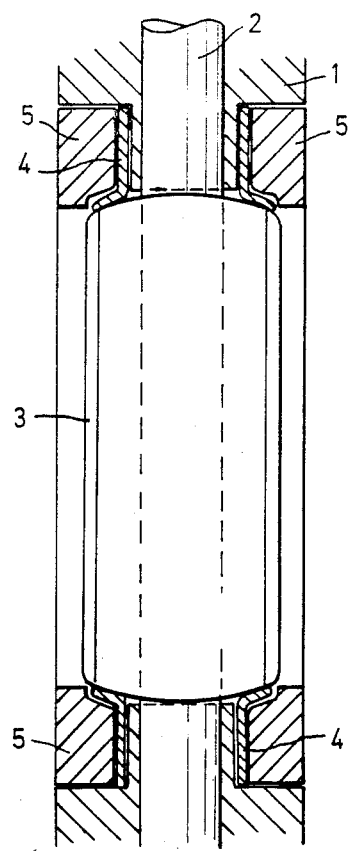
FIG. 1 is a central section through a basic unsophisticated butterfly valve equipped with a pair of seats in accordance with the invention and shown with its valve disc in its fully closed position.

Referring now to the drawings in which like parts throughout are shown with the same reference numerals, there is shown in FIG. 1 a butterfly valve comprised of a valve body 1 in which there is rotatably received the stem 2 of a valve disc 3 which is shown in its fully closed position across the bore through which liquid flow has to be controlled. In this position it sealingly engages with each of a pair of metal valve seats 4 constructed in accordance with the present invention and which are located in recesses in the valve body by retaining rings 5 which are bolted or otherwise secured thereto.

As shown most clearly in FIGS. 1A to 3 inclusive, each valve seat 4 is a metallic ring having a plane radially outer part 4A and a radially inward dished part 4B which is of varying curvature in the axial plane and is intended resiliently to engage the curved rim of the disc 3 as the latter finally approaches and reaches its fully closed position.

Figure 2:
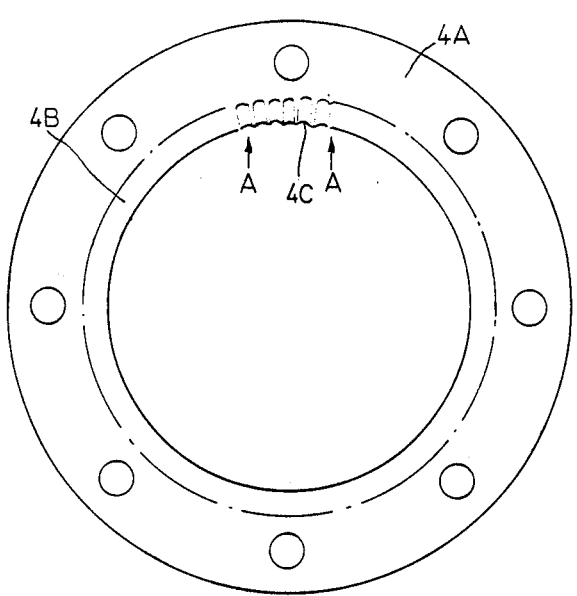
FIG. 2 is a frontal view of a valve seat showings its mode of formation.
Figure 2A:
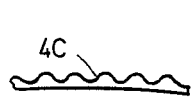
FIG. 2A is an enlarged, fragmentary view, in the direction of arrows A—A in FIG. 2, to show the profile of the webbed part of the valve seat.
Figure 3A:
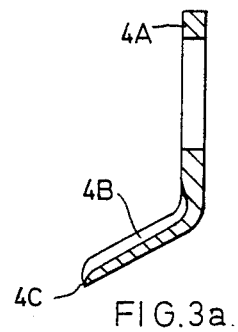
FIG. 3A is an enlarged scale section on line P—P in FIG. 2A.

In manufacture, the valve seat is made from a flat disc stamped out of sheet metal, such as for instance aluminium bronze alloy of 1.25 mm thickness. This disc is formed on its radially outward face, by means of a rolling or pressing operation, with a ring of adjoining radial grooves which form a circle of web connected sealing fingers 4C as shown in FIG. 2 having a typical profile as shown on an enlarged scale in FIG. 2A wherein typically the distance between adjoining crests is 2.5 mm with a maximum web thickness of 1.3 mm and a groove depth of 0.3 mm, it is however advantageous if the grooves are pressed or rolled rather than machined because this changes the grain structure of the metal and enhances it flexing qualities. There may for instance be 90 such fingers or webs.

The radially inward part of the seat is dished after the machining or pressing of the radial grooves or fingers, the curvature of the part 4B or fingers adjacent the juncture with the radially outward part 4A being different from the curvature of the rim of the part 4B.

Figure 1A:
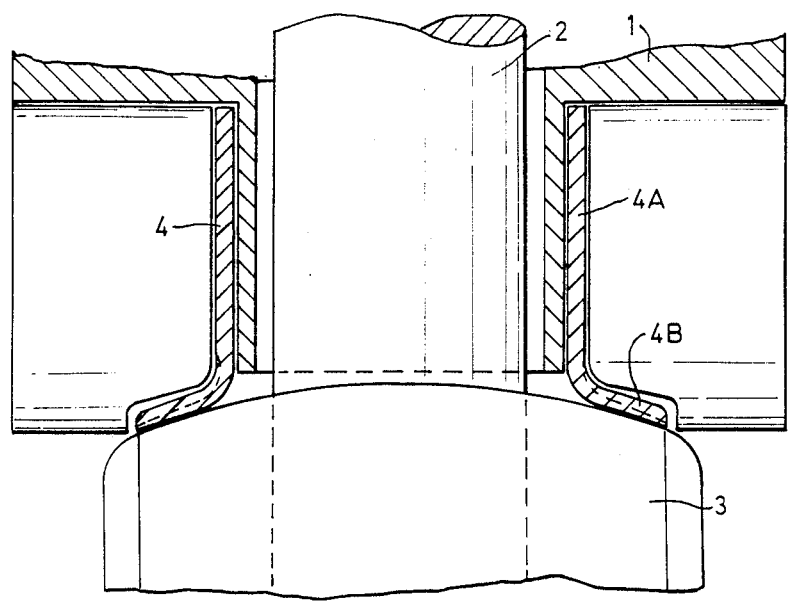
FIG. 1A is an enlarged view of the top part of FIG. 1.
Figure 1B:
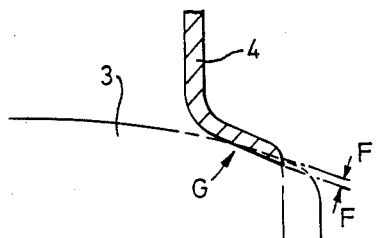
FIG. 1B is a detail of FIG. 1A.

FIG. 1A illustrates as a dashed line the position of the radially outward face of the fingered part 4B of the seat before the radially inward face of the seat is engaged by the valve disc 3 whilst FIG. 1B is intended to show that in point of fact the rim of the seat has an interference fit of for example approximately 0.08 mm tapering to 0 as indicated by the arrows F—F, the seat being a snug fit on the disc at point G.

The choice of metal from which the seats are produced is dictated in general by the environment in which the valve has to operate. However, a popular choice is an aluminium bronze seat in conjunction with a stainless steel disc for a butterfly valve or a ball in the case of a ball valve. Preferably the radially inward or rubbing face of the web connected fingers 4C is coated with a low friction material such as PTFE. Further, this face can also be toughened to withstand to a greater extent the possibility of wear due to the ingress of sand and other foreign bodies to the liquid of which the flow is being controlled.

Figure 3:
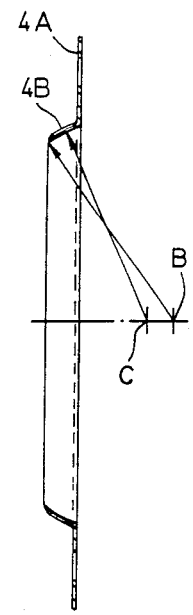
FIG. 3 is a diametric section to illustrate the profile of the valve seat.

FIG. 3 shows that the radially inward part of the disc has an internal radius A from point B which is the centre of the valve disc. However in order to achieve divergence of the fingers to achieve an eventual interference fit on the disc the centre of radius of the forming punch is transferred from point B to point C when traversing from the vertical to the horizontal during grinding, thus maintaining a constant grinding radius with a change of center. This ensures an interference fit between the disc and the webbed rim where the flexing occurs. Finally, the concave bearing surface of the webbed fingers is micromachined to ensure a perfect seal between the disc and the valve seat when assembled.

Figure 4:
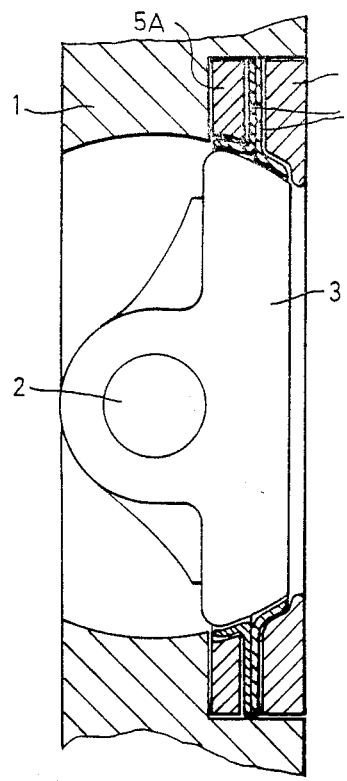
FIG. 4 is a section through a double offset butterfly valve equipped with two differently shaped valve seats according to the invention and shown in its closed position.
Figure 5:
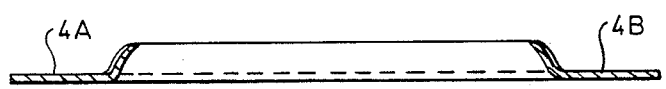
FIGS. 5 and 6 are diametric sections through the two valve seats shown in FIG. 4.
Figure 6:
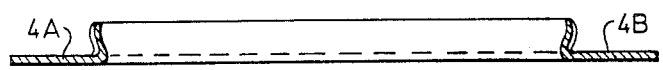

FIGS. 4, 5 and 6 show a typical mode of application of valve seats 4 in accordance with the invention to a double offset butterfly valve, that is to say one in which axis of rotation of the valve disc 3 is offset from the central plane of the disc and also offset to one side of the central bore axis. In this instance an inner seat retaining ring 5A is in two halves to give maximum support to the two valve seats 4 which, as shown in FIG. 5 and FIG. 6 are respectively radially inwardly and radially outwardly dished to match the continuously varying diameter of the disc from one diametric face to the other. These seats 4 are produced in the same manner as has been explained by reference to the previous embodiment.

Figure 7:
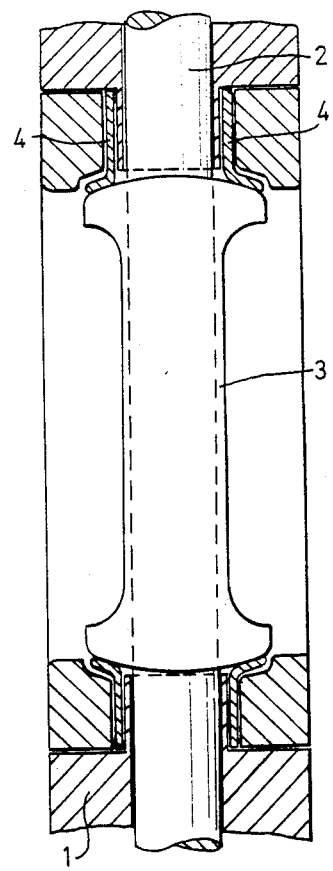
FIGS. 7 and 8 are two sections, one at right angles to the other, of a high performance butterfly valve incorporating two valve seats in accordance with the invention.
Figure 8:
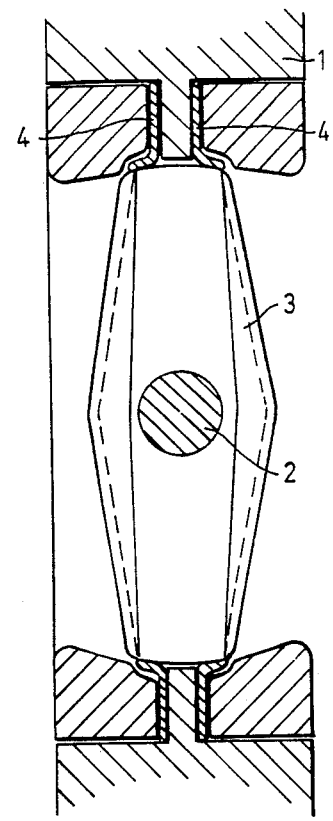
Figure 9:
FIG. 9 is a diametric view of a seat as fitted to the valve shown in FIGS. 7 and 8.

FIGS. 7, 8 and 9 illustrate the use of a pair of seats 4 in accordance with the invention in a high performance butterfly valve which has a disc 3 of varying thickness. This necessitates the provision of two valve seats which are each of matching dished configuration as indicated in FIG. 9, though otherwise identical to those which are illustrated in FIGS. 1 to 4.

Figure 10:
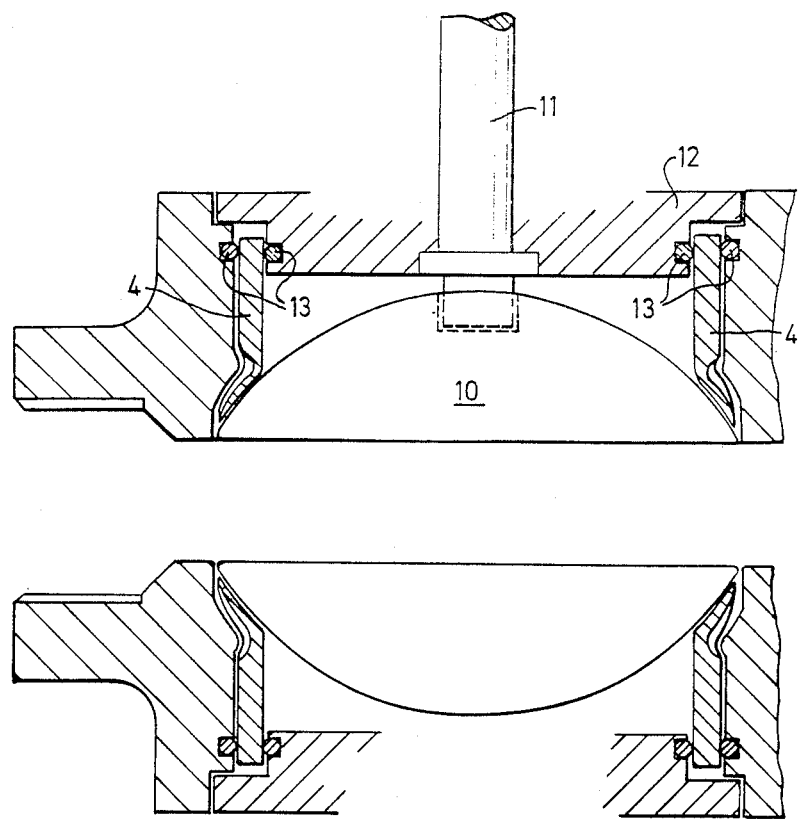
FIG. 10 is a central section through a typical ball valve incorporating two valve seats in accordance with the invention.

FIG. 10 illustrates the application of two valve seats in accordance with the invention in a typical fire-safe ball valve comprising an apertured ball 10 which is turnable by means of a square-ended shaft 11 which passes through a ball valve body plate 12. In this ball valve however, the seats 4 are allowed to move laterally in order to take up any misalignment of the ball 10 during operation.

To this end and to prevent leakage the top, bottom and end walls of the valve body are provided with recesses which accommodate '0' rings 13 made of resilient material which engage the respective sides of the valve seats 4.

Figure 11:
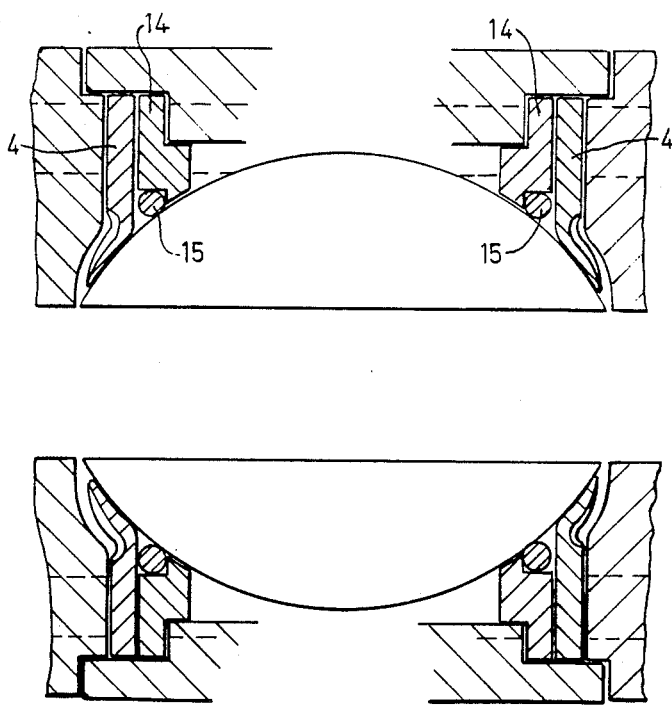
FIG. 11 is a central section through another ball valve equipped with two valve seats in accordance with the invention.

In FIG. 11 is shown another type of ball valve, which is both fire safe and gas tight wherein each of the valve seats 4 is inwardly backed by a locating ring 14 which is suitably recessed to act as a a carrier for an '0' ring 15 which is made of resilient material.

As previously mentioned the fingered parts of the valve seats 4 are formed by a machining or pressing operation with the changng radius on the seat face even though the overall geometry may change to suit the particular location of the valve seat. It may also be mentioned that when the valve seats are incorporated in ball valves they may be of increased thickness compared with valve seats used in conjunction with butterfly valves, in order to enable the valve seats to operate under very high pressures without distortion.

Figure 12:
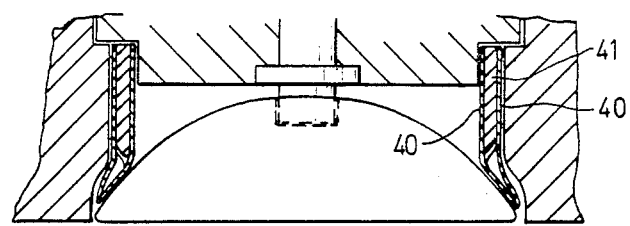
FIG. 12 is a central section through a ball valve similar to that of FIG. 11 but equipped with two valve seats of composite structure.
Figure 12:
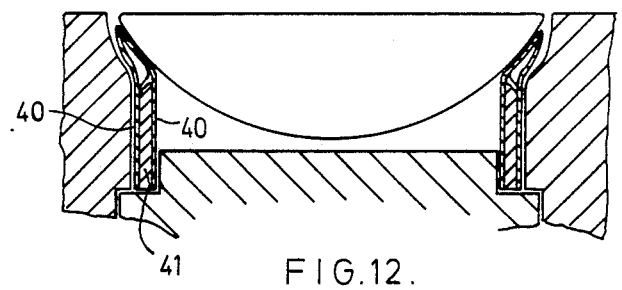
Figure 13:
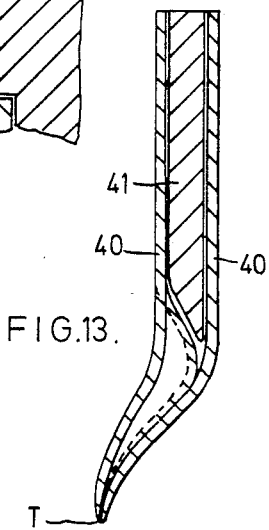
FIG. 13 is an enlarged sectional view of a composite structure valve seat as shown in FIG. 12.

FIG. 12 illustrates a ball valve which is equipped with two valve seats 4 having the same characteristics as have already been described but which is intended for use in more extreme environments. These valve seats of which an enlarged part cross-section is illustrated in FIG. 13 comprises two high nickel alloy pressed discs 40 which are secured by welding and/or brazing to the respective faces of a central, thicker, spacer disc 41. One of the discs 40 has pressed radial web fingers 40 and the discs are welded together at their line of convergence T. This combination of pressings is then age-hardened to increase the spring effect and the intended ball-contacting surface is coated with a low friction material. Adjacent the line of convergence T the radius of the ball-contacting surface is suitably less than that of the ball in order to achieve the interference fit therewith.

Figure 14:
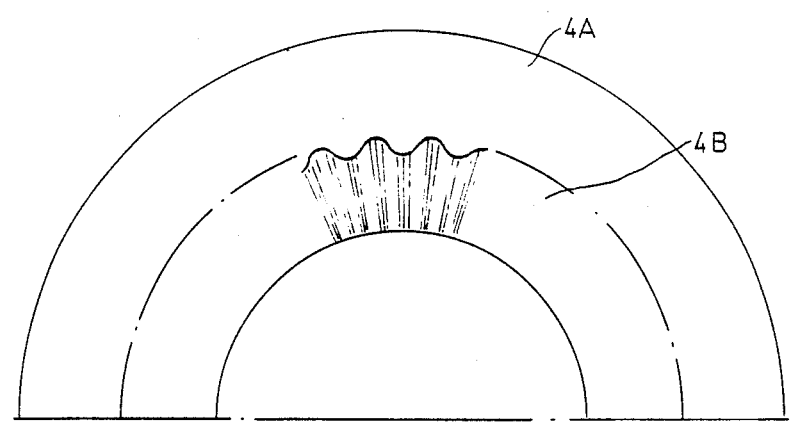
FIG. 14 is a frontal view which shows some of the webbed fingers of an alternative form of composite valve seat.
Figure 15:
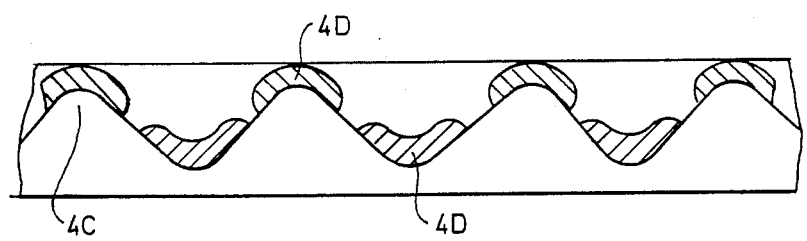
FIG. 15 is an enlarged scale cross-section of the detailed part of FIG. 14.

The seats which have been described and are illustrated in FIGS. 1 to 13 are of relatively low cost and are ideal for easily accessible applications where replacement is relatively easily performed. However, in submarine installations—for instance oil wells—where the costs of having to change a valve are very high it is strongly recommended that the valve seat should be of composite bi-metallic construction so as to combine the tremendous ductility of alloys such as aluminium—bronze with the high strength of high nickel alloys. This is accomplished somewhat as illustrated in FIG. 14 which shows a seat having a web finger portion 4C comprised of a ductile sheet metal base part overlaid at the peaks and troughs of the web fingers by caps and fillets 4D of a high nickel alloy secured thereto by brazing. In certain instances it may however be sufficient for the hard nickel alloy to be adhered only to the troughs.

Figure 16:
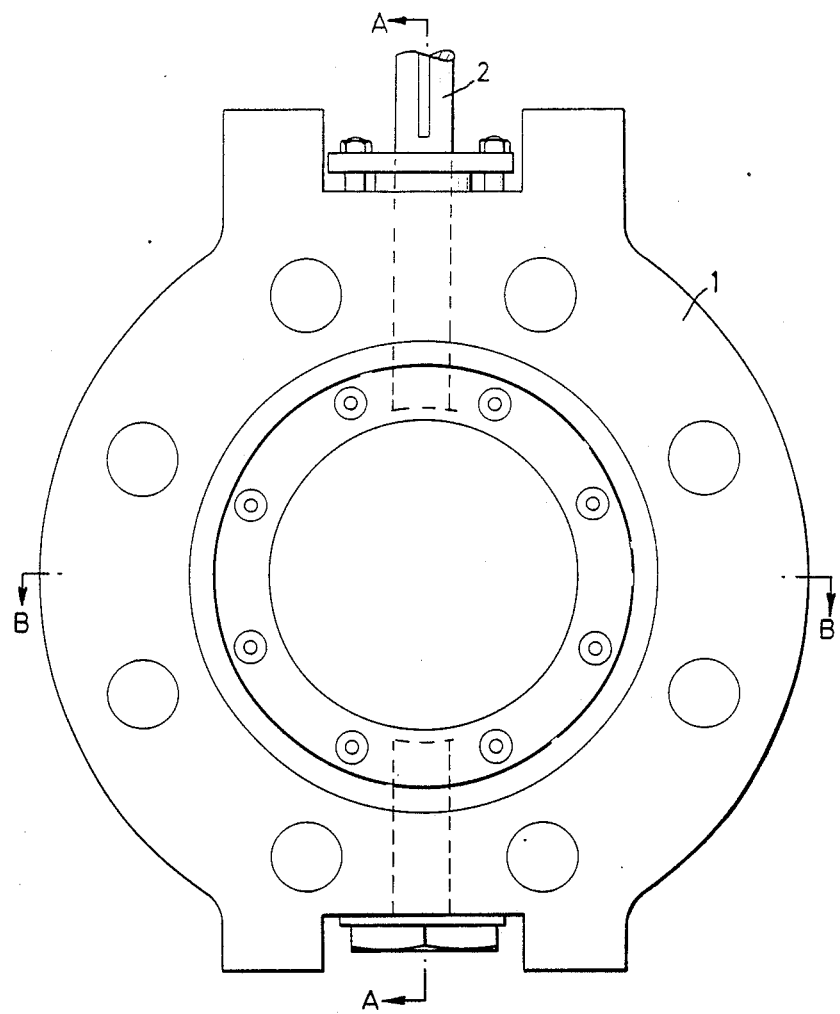
FIG. 16 is an end view of the body or casing of a further embodiment of a butterfly valve incorporating valve seats in accordance with the invention.
Figure 17:
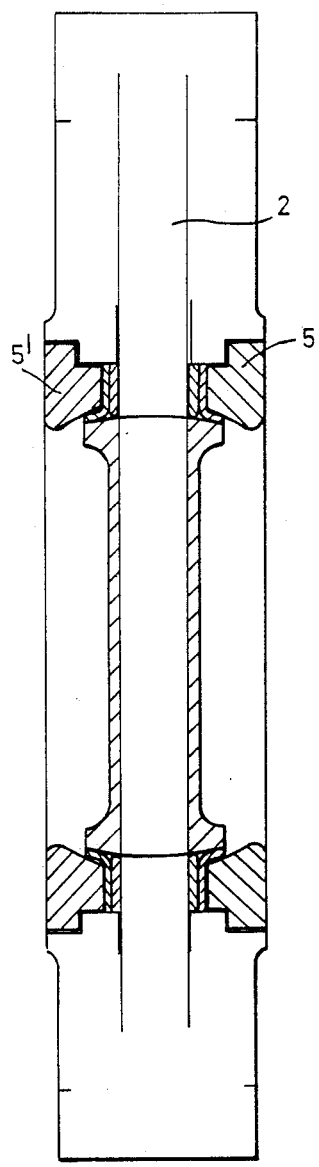
FIG. 17 is a section on line A—A of FIG. 13.
Figure 18:
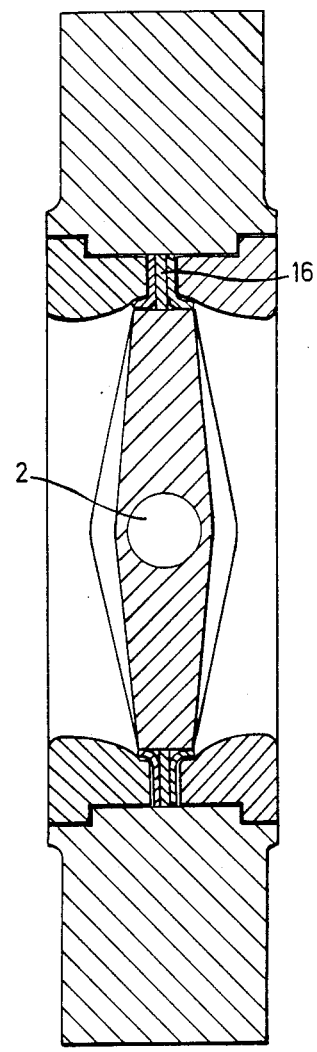
FIG. 18 is a section on line B—B of FIG. 13.
Figure 19:
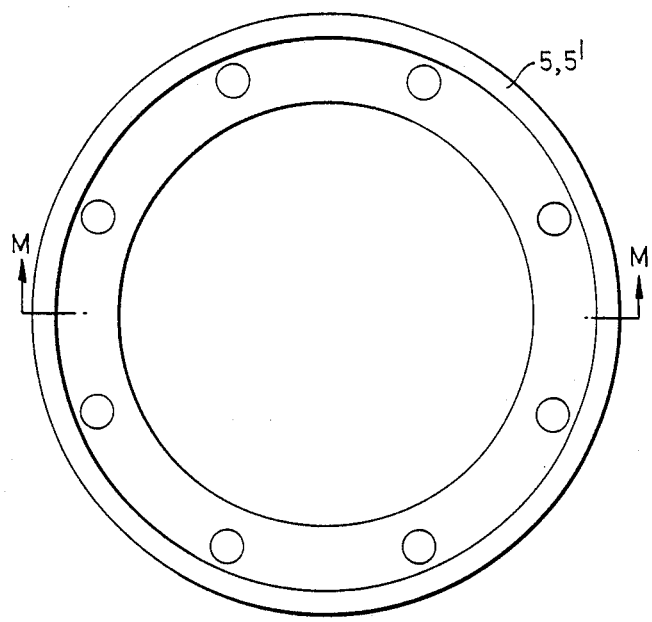
FIG. 19 is a face view of a valve seat retaining ring.
Figure 20:
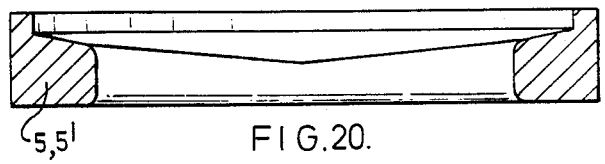
FIG. 20 is a section on line M—M of FIG. 16.
Figure 21:
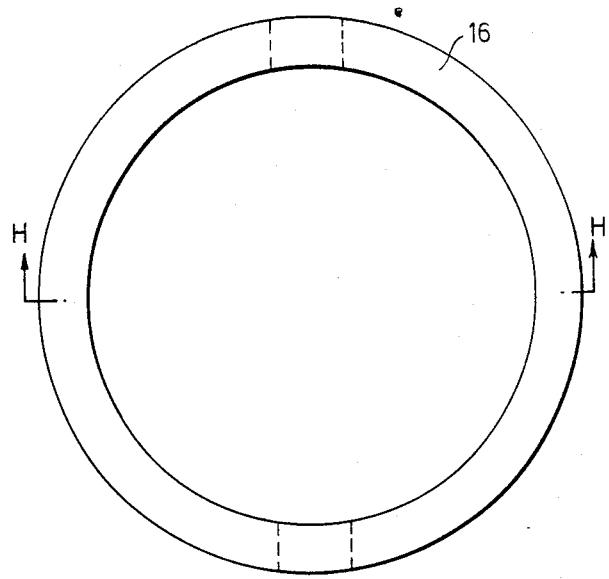
FIG. 21 is a face view of a spacer ring.
Figure 22:
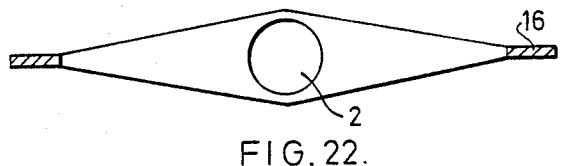
FIG. 22 is a section on line H—H of FIG. 18.
Figure 23:
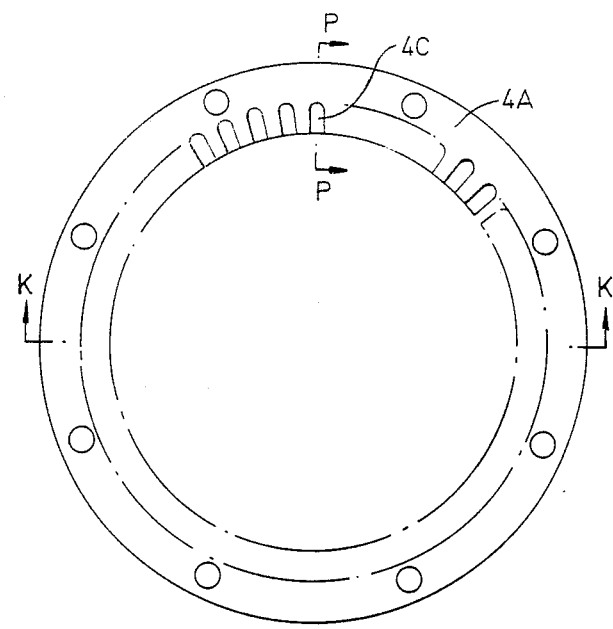
FIG. 23 is a face view of a metal seat.
Figure 24:
FIG. 24 is a section on line K—K of FIG. 20.
Figure 25:
FIG. 25 is a section on line P—P of FIG. 20.

The particular designs of butterfly valve, of which component parts are illustrated in FIGS. 16 to 32 inclusive of the drawings, incorporate valve seats in accordance with the invention in conjunction with metal heat retaining rings, metal spacer rings and interposed additional sealing rings made of PTFE. FIG. 16 shows a typical valve body 1 within which there is located a pair of seat retaining rings 5, 5', as shown in FIGS. 17, 18 and 19. The seat retaining ring 5 is drilled and tapped, chilled, and then expanded into the valve body to which it is finally welded or brazed, whilst the other ring 5' is drilled and counter-bored to lock the seats 4 and spacer ring 16 firmly in position. The purpose of the spacer ring 16, which is shaped as shown in FIGS. 21 and 22, is to ensure that the seats 4 which have the configuration shown in FIGS. 23, 24 and 25 are both accurately and firmly held in position.

Figure 27:
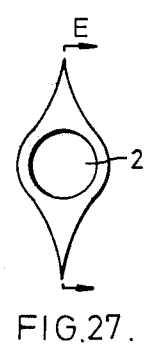
FIG. 27 is an elevation of a valve disc support.
Figure 26:
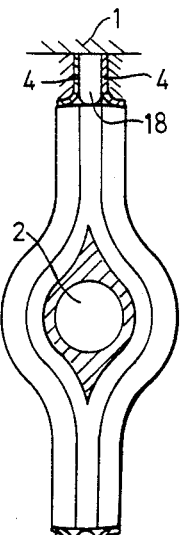
FIG. 26 is a section of a composite butterfly valve disc.
Figure 28:
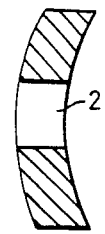
FIG. 28 is a section on line E—E of FIG. 24.
Figure 29:
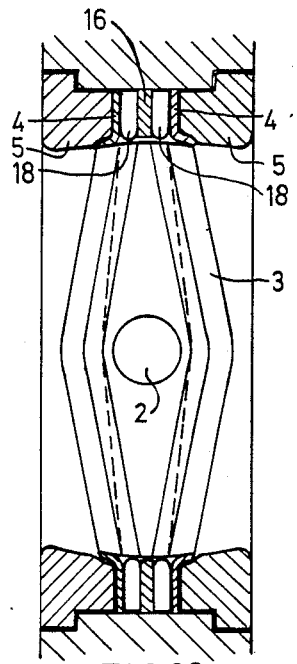
Figure 30:
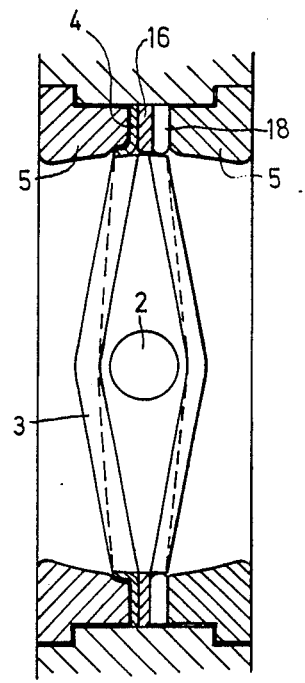
Figure 31:
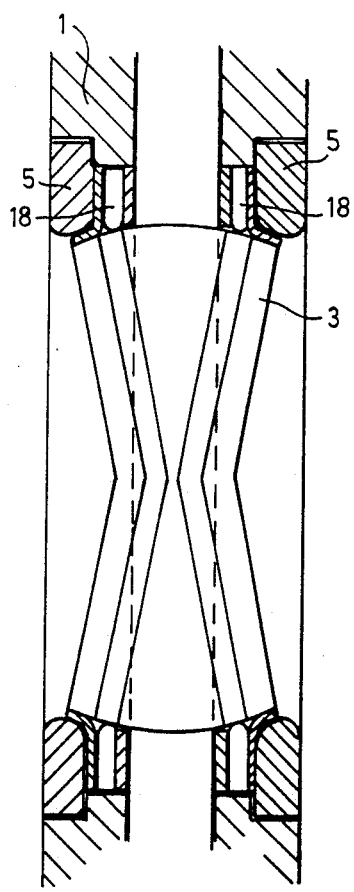
Figure 32:
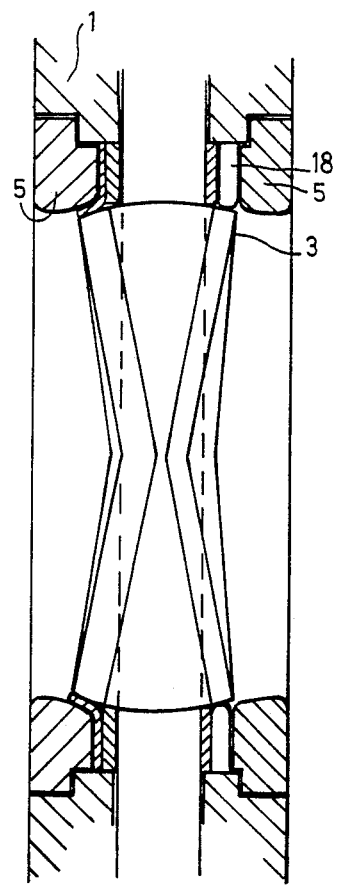

FIGS. 26 to 28 show details of a butterfly valve disc 3 which is provided with a one-piece moulded central sealing section 17 made of PTFE which, when the valve is closed, makes sealing contact with a sealing ring 18, also made of PTFE, which is located between the two metal seats 4.

From FIGS. 29 to 32 inclusive wherein valve discs 3 are indicated in full and the remainder in section there can be seen the provision of either one or two PTFE sealing discs 18 sandwiched between the metal valve seats 4 and the spacer rings 16 or between a seat retaining ring 5 and a spacer ring 16.

It is an advantage of the valve seats in accordance with the invention that due to the webbed finger configuration and varying radial profile of the radially inward dished part of the annular metal disc this part is resiliently flexible and can closely conform to the curvature of the butterfly valve disc or the ball valve ball as the case may be when the latter is in its closing position. Moreover the webbed fingers prevent any possibility of fluttering of the seat in high flow velocity situations which could otherwise result in seat fracture or failure or a flow disaster.

I claim:

1. A metal valve seat for a valve selected from the group consisting of butterfly valves and ball valves, and having a closure member selected from the group consisting of a butterfly valve disc and a ball valve ball, said valve seat having the form of an apertured disc with a radially outward part by which it is securable to a valve body and with a radially inward dished part which projects laterally around the disc aperture, characterized in that the radially inward dished part is formed with a plurality of circumferentially spaced portions of alternately greater and lesser thickness whereby said portions of greater thickness form radial fingers and said portions of lesser thickness form webs laterally interconnecting said fingers, and said fingers and webs have a radially inward concave sealing surface of varying generative radius adapted to be interference fit with said closure member.

2. A metal valve seat as claimed in claim 1 in which the portions of lesser thickness are pressed or machined radial grooves formed in one face of the said radially inward dished part of the disc.

3. A metal valve seat as claimed in claim 1 in which said radially inward dished part comprises a ductile sheet metal base which has an undulating profile with peaks and troughs defining said regions of greater and lesser thickness, and an overlay of a high strength nickel alloy disposed on at least one selected from said peaks and troughs.

4. A metal valve seat as claimed in claim 1 in which the apertured disc is a composite structure comprised of a spacer disc and two outer discs secured to the respective faces of said spacer disc, the outer discs projecting radially inwardly beyond the spacer disc and being secured together around their line of convergence.

5. A butterfly valve having a valve body with a recess therein, a butterfly valve disc, at least one metal valve seat having the form of an apertured disc with a radially outward part by which it is securable to a valve body and with a radially inward dished part which projects laterally around the disc aperture, characterized in that the radially inward dished part is formed with a plurality of circumferentially spaced portions of alternately greater and lesser thickness whereby said portions of greater thickness form radial fingers and said portions of lesser thickness form webs laterally interconnecting said fingers, and said fingers and webs have a radially inward concave sealing surface of varying generative radius adapted to be interference fit with said butterfly valve disc, and at least one retaining ring for securing said valve seat in said recess in said valve body.

6. A butterfly valve as claimed in claim 5 wherein a pair of said metal valve seats respectively of different dished profile are disposed in backing contact in a said recess between an inside said retaining ring and an outside said retaining ring.

7. A butterfly valve as claimed in claim 6 wherein the said inside retaining ring is in two halves.

8. A butterfly valve as claimed in claim 5 having a pair of said valve seats located in position in said valve body recess, a spacer ring between said valve seats and a pair of said retaining rings outside said valve seats, said spacer and retaining rings locating said valve seats in said recess.

9. A butterfly valve as claimed in claim 5 wherein said butterfly valve disc is of non-uniform cross-section, and at least on said valve seat which is dished in an axial plane to match the said cross-section.

10. A butterfly valve as claimed in claim 5 which comprises at least one sealing ring made of low friction non-metallic material disposed parallel and adjacent a said valve seat or seats in said valve body.

11. A butterfly valve as claimed in claim 10 wherein said butterfly valve disc has a central section made of low friction non-metallic material which, when the valve is closed, is opposed to a said low-friction non-metallic material sealing ring in said valve body.

12. A ball valve having a ball valve ball, a valve body and, in the valve body at least one metal valve seat having the form of an apertured disc with a radially outward part by which it is securable to a valve body and with a radially inward dished part which projects laterally around the disc aperture, characterized in that said radially inward dished part is formed with a plurality of circumferentially spaced portions of alternately greater and lesser thickness form radial fingers and said portions of lesser thickness form webs laterally interconnecting said fingers, and said fingers and webs have a radially inward concave sealing surface of varying generative radius adapted to be interference fit with said ball valve ball.

13. A ball valve as claimed in claim 12 in which the said radially outward part of said metal valve seat is sealed relative to the adjacent part of the valve body by means of at least one interposed ring of resilient material.

* * * * *